F. ARBEY.
MACHINES FOR JOINTING STAVES.

No. 186,704. Patented Jan. 30, 1877.

WITNESSES:
Chas. Nida
J. H. Scarborough

INVENTOR:
F. Arbey
BY
ATTORNEYS.

UNITED STATES PATENT OFFICE.

FERDINAND ARBEY, OF PARIS, FRANCE.

IMPROVEMENT IN MACHINES FOR JOINTING STAVES.

Specification forming part of Letters Patent No. 186,704, dated January 30, 1877; application filed November 25, 1876.

*To all whom it may concern:*

Figure 1:
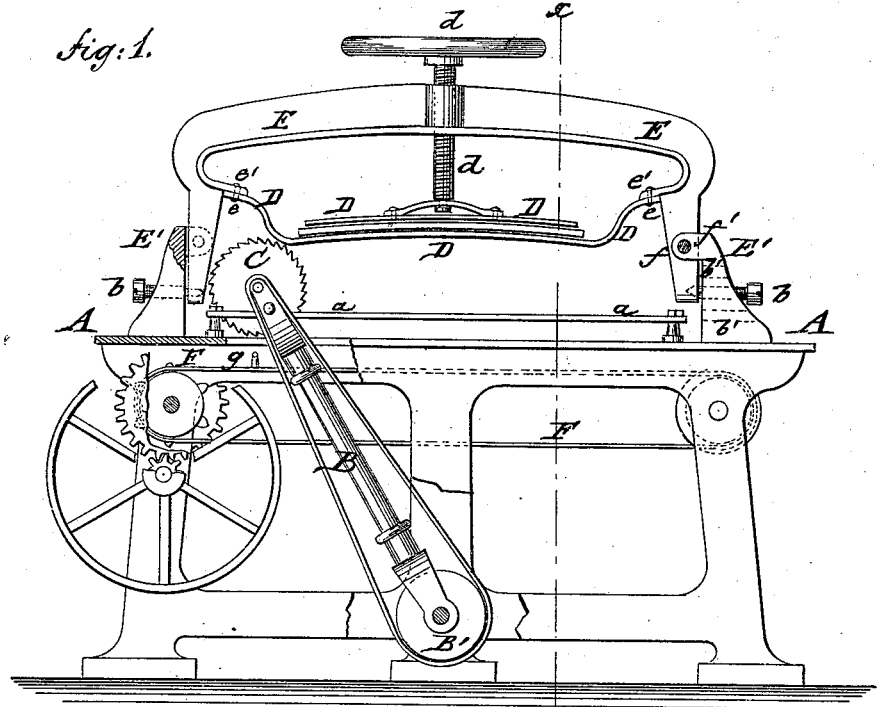
Figure 2:
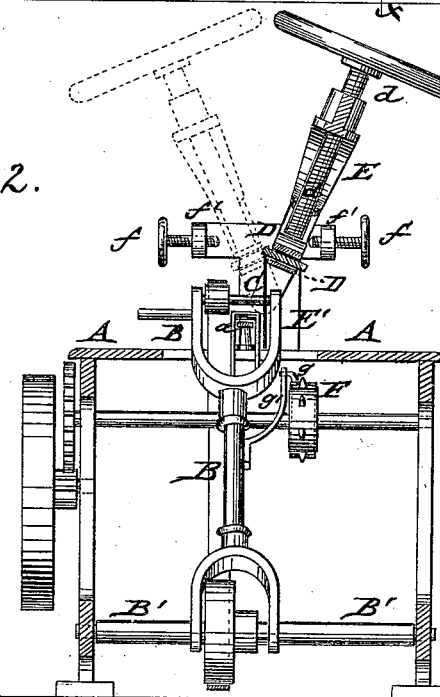

Be it known that I, FERDINAND ARBEY, of Paris, France, have invented an Improvement in Machines for Jointing Staves, of which the following is a specification:

In the accompanying drawing, Figure 1 represents a front elevation; and Fig. 2 a vertical transverse section on line $x$ $x$ of Fig. 1.

Similar letters of reference indicate corresponding parts.

The object of this invention is to furnish a machine for cutting staves, so as to produce an exact fitting of the joints, according to the curvature and diameter of the barrel; the machine being designed with a view to economize wood by making barrels with staves of equal or unequal width, as desired.

The invention will first be described in connection with the drawing, and then pointed out in the claims.

In the drawing, A represents the supporting-table of my improved stave-cutting machine, which is centrally recessed for the swinging arm B, that is hung to the driving-shaft B′ at the lower part of the machine, and guided along the bar $a$ of the table. A circular saw, C, is mounted in the customary manner on the upper forked end of the arm B, and revolved, by pulley-and-belt connection with shaft B′, simultaneously with the swinging of the arm from one side of the table to the other. The saw C swings in a vertical plane passing through the axis of the barrel for which the staves are cut.

The staves are exposed to the action of the saw by being placed between detachable clamp-pieces D of a longitudinal arc-shaped frame, E, that is pivoted to pointed center-pins $b$ of fixed side standards E′ of lathe A. A central hand-screw, $d$, of frame E, binds the upper clamp-piece firmly to the lower clamp-piece, which is secured at both ends, by fastening-screws $e$, to seats $e'$ at the sides of frame E.

As the curvature of the clamping-pieces vary for barrels of greater or less size, a set of the same is provided for each size, and used in cutting the staves for that size.

The swinging frame E is adjusted to a greater or less diameter of the barrel by the center-pins $b$, which are adjustable in holes $b'$, of the standards E′, to greater or less height above the table, the pivot-pins forming the axis of the barrel. The pointed center-pins $b$ are seated in corresponding holes or recesses of the arms of frame E.

The extent of swinging motion of frame E in a direction transversely to the saw-plane is controlled by symmetrical set-screws $f$ of side lugs $f'$ of standards E′, and thereby the exact width of the staves obtained.

For a greater width of staves, the set-screws are placed at greater distance from the center line. For a less width of staves the set-screws are brought closer to the same.

When the swinging frame E is thus adjusted to the radius of the barrel and width of staves the circular saw is first passed, either by a handle, or by means of an endless revolving chain, F, that engages, by a fixed hook, $g$, a side projecting rod, $g'$, of the swinging arm B, along one side of the stave, and, after swinging the stave-clamping frame forward, returned along the other side of the stave. The edges thus cut by the saw are radial to the axis of the barrel, and produce thereby a perfect-fitting and accurate joint of the same.

The barrels may be made of staves of equal size; and also, for the purpose of economizing wood, with staves of different size, which fit with the same exactness as the staves of equal size.

Having thus described my invention, I claim as new and desire to secure by Letters Patent—

1. The combination of the arc-shaped frame E with the detachable clamping-pieces D, bent to the curvature of the barrel, and with one or more clamping-screws, $d$, to hold the stave securely to the action of the saw, substantially as specified.

2. The combination of swinging frame E, having side seats $e'$, with the curved lower clamping-piece D, and with fastening-screws $e$, substantially as described.

3. The combination of the clamping-frame E with the vertically-adjustable center-pivots *b*, and with the perforated standards E', to adjust the clamping-frame to different diameters of the barrel, substantially as set forth.

4. The combination of the pivoted clamping-frame E, with adjusting set-screws *f*, of the standards E', to adjust the motion of the frame to the width of the stave to be cut, substantially as shown and described.

FERDINAND ARBEY.

Witnesses:
  PAUL GOEPEL,
  EUGÉNE L. TOURET.